United States Patent
Ferguson et al.

[11] Patent Number: 5,097,860
[45] Date of Patent: Mar. 24, 1992

[54] PRESSURE REGULATOR FOR UNDERWATER BREATHING APPARATUS

[75] Inventors: Arthur R. Ferguson, Northbrook; Raymond Fundora, Chicago, both of Ill.

[73] Assignee: Dacor Corporation, Northfield, Ill.

[21] Appl. No.: 637,653

[22] Filed: Jan. 4, 1991

[51] Int. Cl.5 .............................................. F16K 17/36
[52] U.S. Cl. ................... 137/78.1; 137/505.42; 128/204.29
[58] Field of Search ............. 137/505.11, 505.14, 137/505.42; 128/204.29

[56] References Cited
U.S. PATENT DOCUMENTS

| | | | |
|---|---|---|---|
| 2,487,650 | 11/1949 | Grove et al. | 137/505.11 |
| 2,806,481 | 9/1957 | Faust | 137/505.42 |
| 3,920,033 | 11/1975 | Ferrando | 137/81.2 |
| 3,972,346 | 8/1976 | Wormser | 137/505.42 |
| 4,527,582 | 7/1985 | Buckle et al. | 128/204.29 |

FOREIGN PATENT DOCUMENTS

| | | | |
|---|---|---|---|
| 57411 | 8/1890 | Fed. Rep. of Germany | 137/505.11 |
| 1364790 | 8/1974 | United Kingdom | 137/505.11 |
| 1531768 | 11/1978 | United Kingdom | 137/204.29 |

Primary Examiner—A. Michael Chambers
Attorney, Agent, or Firm—Edmond T. Patnaude

[57] ABSTRACT

The first stage regulator of a two-stage underwater breathing apparatus utilizes an imperforate force transfer mechanism to automatically increase the rate at which breathing air is delivered from a high pressure supply to the second stage regulator as the diver descends in the water. The first stage regulator is sealed from the ambient by the imperforate force transfer mechanism which increases the resistance of the regulator to icing and corrosion and prevents particulates entrained in the ambient water from entering the regulator mechanism and interfering with its operation.

7 Claims, 2 Drawing Sheets

PRESSURE REGULATOR FOR UNDERWATER BREATHING APPARATUS

The present invention relates in general to pressure regulators, and it relates in particular to a new and improved first stage pressure regulator of the type used in a two-stage, self-contained underwater breathing system.

BACKGROUND OF THE INVENTION

Present day underwater breathing systems used by SCUBA divers consist of a tank containing a supply of air or other breathing gas at a relatively high pressure which initially exceeds 3000 p.s.i. Air is supplied to the diver at a pressure slightly grater than the pressure of the ambient water via a second stage demand regulator carried by the mouth of the diver whenever the diver inhales. Air from the tank is supplied to the second stage regulator at a constant intermediate pressure of about 140 p.s.i. via a first stage regulator mounted directly on the tank.

It has been observed that a diver's breathing effort increases as he or she descends in the water. Because the external pressure on the diver's body is proportional to the diver's depth, the lungs require constantly increasing air pressure during descent resulting in a constantly increasing air flow rate to the lungs. However, the air conduit passages in regulator systems are of fixed sizes, and therefore, as the air flow rate increases the pressure drops in the regulator system air conduit passages increase. As a result, breathing becomes more difficult as the depth of the diver increases since the diver must increase the suction effort to compensate for the increased regulator pressure drops.

Another disadvantage of present day first stage regulators arises from the fact that they are susceptible to icing and corrosion from the impurities contained in the ambient water, and that decreases the useful life of the regulators and increases the maintenance cost thereof.

SUMMARY OF THE INVENTION

Briefly, there is provided in accordance with the present invention a new and improved first stage regulator having an imperforate pressure transfer means interposed between the ambient water and the operating mechanism of the regulator. In one embodiment of the invention the imperforate force transfer means is a diaphragm and in another embodiment of the invention the imperforate force transfer means is a sealing piston. A pressure relief valve is provided in the imperforate force transfer device to prevent pressure build up against the inside surface of the device.

In accordance with another aspect of the invention, a valve control piston or diaphragm is connected to the imperforate force transfer device, and because of the size relationship of the valve control diaphragm or piston to that of the imperforate force transfer device, when the diver inhales and thus makes a demand for air, the associated valve opens by an amount which is proportional to the ambient pressure. Accordingly, the intermediate pressure of the air which is supplied to the second stage regulator is not a constant value above ambient as in the prior art underwater breathing system, but he intermediate pressure increases above ambient proportionately with changes in the ambient water pressure.

GENERAL DESCRIPTION OF THE DRAWINGS

A better understanding of the present invention may be had from a reading of the following detailed description taken in connection with the accompanying drawings wherein.

DETAILED DESCRIPTION OF A PREFERRED EMBODIMENT

Figure 1:
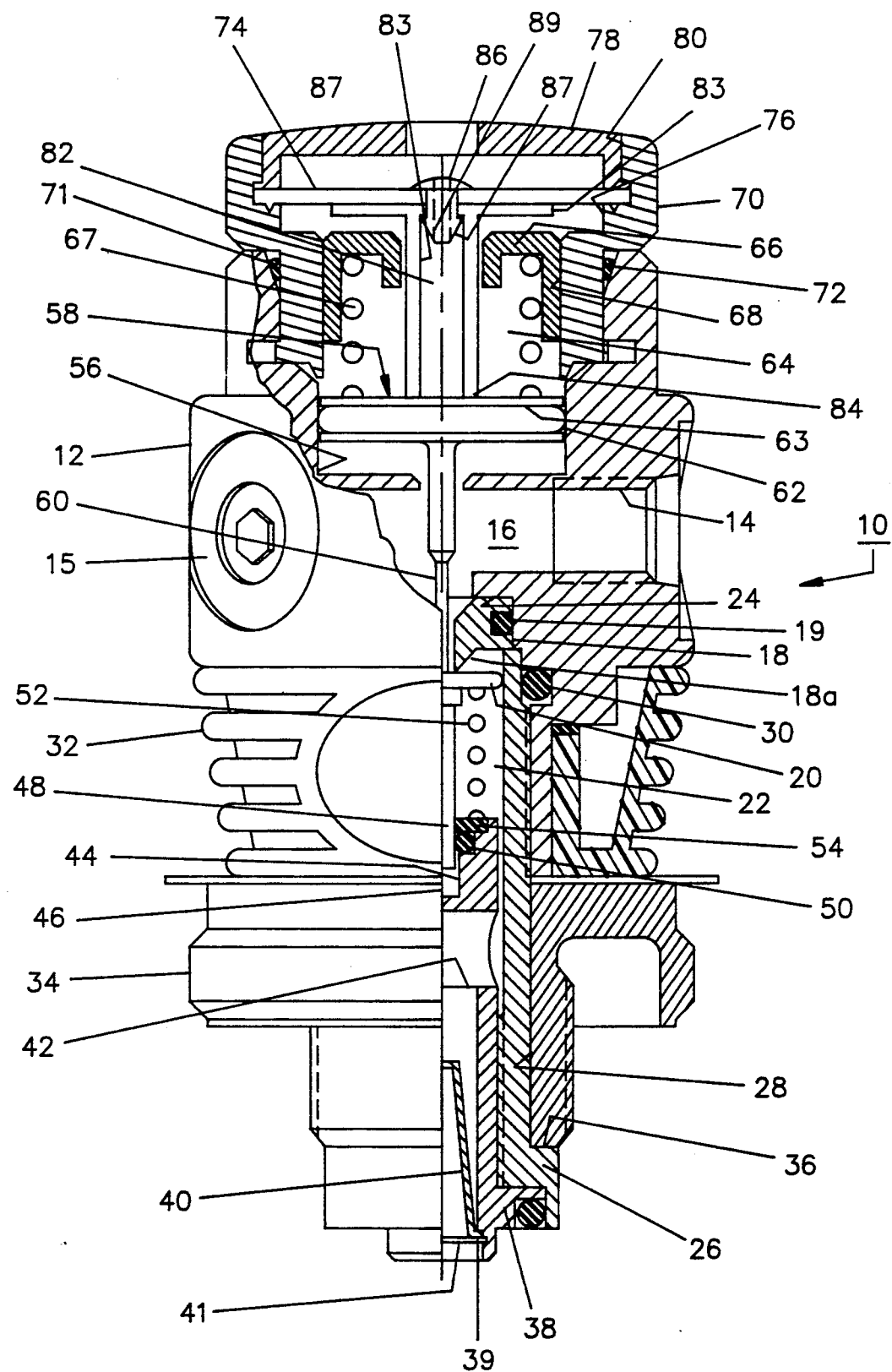
FIG. 1 is a longitudinally sectioned view of a first stage regulator embodying the present invention.

Referring particularly to FIG. 1, a first stage pressure regulator 10 may be seen to include a body member 12 having a plurality of internally threaded radial outlet ports 14 which are adapted to receive a hose fitting (not shown) for coupling the outlet port to the inlet port of a second stage regulator or other devices. In the drawings, only one of the ports 14 is shown open, the others being sealably covered by threadedly mounted sealing caps 15. As may be seen, the outlet port 14 opens directly into an intermediate pressure chamber identified by the reference number 16.

An annular valve seat member 18 is tightly fitted in the central longitudinal bore in the body 12 and includes a depending annular valve seat 18a which is generally triangular in cross-section. An annular, resilient sealing gasket 19 seals the seat member 18 to the body 12. A circular valve member 20 operates in conjunction with the valve seat 18a to controllably communicate the intermediate pressure chamber 16 to a high pressure chamber 22 connected to a high pressure supply of air or other breathable gas (not shown). The seat member 18 is held against an annular shoulder 24 surrounding the central longitudinal bore in the body 12 by means of a sleeve 26 which is threadedly received in a counterbore 28 in the body 12. A resilient sealing gasket such as an O-ring 30 is received in an annular groove in the body 12 near the top of the sleeve 267 to seal the sleeve to the body in order to prevent high pressure air from leaking between the sleeve 26 and the body 12 to the ambient. A plastic dust cover 32 is fitted over the lower end portion of the body 12 and is held in place by means of a mounting sleeve 34 threadedly attached over the lower portion of the sleeve 26 against an upwardly facing annular shoulder 36.

A tubular high pressure inlet port member 38 is threadedly received in the sleeve 26, and an external annular flange 39 on an inverted filter cup 40 is fitted into the bottom of the member 38 and is held in place by means of a conventional snap ring 41. High pressure air which enters the regulator through the inlet port flows through the filter cup 40 and enters the high pressure chamber 22 via a radial conduit 42 in the port member 38.

A blind hole 44 is provided in the upper end of the member 38 and defines a pressure balancing chamber 46 at the lower end of a tubular valve stem 48 on which the valve member 20 is mounted. As shown, a resilient sealing gasket in the form of an O-ring 50 is located in an internal annular groove at the top of the member 38 and is compressed between the member 38 and the valve stem 48 to seal the pressure balancing chamber 46 from the high pressure chamber 22. The valve member 20 is biased toward a closed position by means of a coil spring 52 which surrounds the valve stem 48 and is compressed between the lower side of the valve member 20 and a flat washer 54 mounted in a second counterbore at the top of the member 38.

Mounted in a cylindrical bore 56 in the upper portion of the body 12 is a valve control piston 58 which includes a depending connecting rod 60 which loosely fits into the upper end of the valve stem 48. An annular resilient sealing gasket 62 is fitted in an external annular groove 63 in the piston 58 and is compressed against the wall of the bore 56 to seal a pressure chamber 64 located above the piston 58 from the intermediate pressure chamber 16 located below the piston 58. A tubular intermediate pressure adjustment member 66 is threadedly received in an internally threaded bore 68 in a cap member 70 which is in turn threadedly received in an internally threaded bore 72 at the top of the body 12. A coil spring 67 is compressed between the top surface of the piston 58 and the bottom surface of the adjustment member 66 to bias the piston 58 in a downward direction. An annular resilient sealing gasket 71 is fitted between the body member 12 and the cap member 70.

An imperforate force transfer means in the form of an imperforate, flexible diaphragm 74 has its peripheral portion resting on an annular ledge 76 and is held in place by means of a centrally apertured cap 78 which is threadedly received in an internally threaded bore 80 in the cap 78. The diaphragm 74 is operatively connected to the piston 58 by means of a rigid tube 82 whereby the diaphragm 74 and the piston 58 move in unison. The longitudinal passage 83 in the tube 82 is connected to the ambient chamber 64 by means of a transverse opening 84 in the wall of the tube 82, and a unidirectional relief valve 86 is mounted over the top of the passage 83 to prevent the pressure in the intermediate pressure chamber 64 from exceeding ambient pressure in the event of a leak between the intermediate pressure chamber 16 and the pressure chamber 64. The valve 86 may be a flexible member position over the opening at the top of the member 82.

It will be seen that the diaphragm 74 constitutes an imperforate, force transfer member as well as a sealing member which seals the piston 58 from direct contact with the ambient water and thus reduces the likelihood of freezing and corrosion of the working parts of the regulator 10. The area of the upper surface of the diaphragm 74 which is exposed to the ambient is substantially greater than the area of the lower surface of the piston 58 which faces the intermediate pressure chamber 16. Consequently, as the ambient pressure on the diaphragm 74 increases, the rate at which the intermediate pressure increases in chamber 16 is greater than the rate at which the ambient pressure increases. This rate increase is proportional to the ratio of the effective working area of the upper surface of the diaphragm 74 to the area of the lower surface of the piston 58. The result is an increased intermediate pressure rise above ambient as the diver descends which compensates for the air conduit passage pressure drops due to the increased air flow rate at the greater depth.

OPERATION

In use, the high pressure inlet port at the bottom of the regulator 10 is coupled via a conventional fitting (not shown) to a pressure tank containing air or other breathable gas at an elevated pressure. The outlet port 14 is connected by conventional fittings and a flexible hose (not shown) to a second stage demand regulator. During exhalation or when the diver is holding his or her breath, the intermediate pressure chamber 16 is sealed from the ambient. Ordinarily, the intermediate pressure is set at 140 p.s.i. above ambient pressure. When so adjusted, the upward force exerted by the spring 52 plus the upward force exerted on the piston 58 by the air in the intermediate pressure chamber 16 equals the downward force exerted by the spring 67 plus the downward force exerted on the piston 58 by the ambient water pressure acting through the diaphragm and the connecting member 82. As is well known in the art, no opening or closing force is exerted on the valve 20 by the high pressure in the chamber 22 because of the balance chamber 46 which is connected to the intermediate pressure chamber via the passageway in the valve stem 48.

As the diver descends, the ambient pressure increase on the diaphragm 74 increases the downward force on the piston 58 equal to the product of the effective working area of the diaphragm 74 times the ambient pressure increase. This downward force increase is counteracted by an equal increased upward force on the piston 58 exerted by an increase in the intermediate pressure. Since the effective working area of the diaphragm 74 is larger than the area of the piston 58, the increase in intermediate pressure will be greater than the ambient pressure increase. As a consequence, the intermediate pressure increases over ambient pressure with depth to make up for pressure drops in the regulator mechanism caused by the increased air flow rate required as the diver descends.

Conventional regulators maintain the intermediate pressure at a preset value, typically 140 p.s.i. above ambient pressure at all depths.

Figure 2:
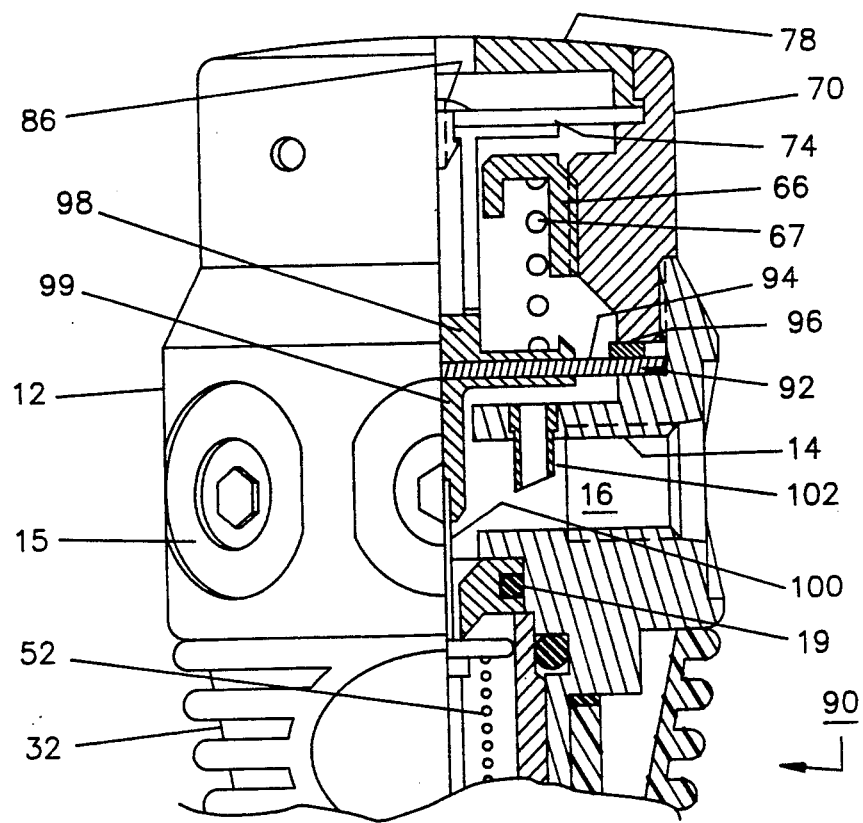
FIG. 2 is a fragmentary, longitudinally sectioned view of another first stage regulator embodying the present invention.

Referring to FIG. 2, there is shown a first stage regulator 90 including another embodiment of the present invention. The regulator 90 is similar to the regulator 10 and includes many identical parts, and such parts are identified in FIG. 2 by the same reference numbers used to identify the same parts in FIG. 1. The principal difference between the regulators 10 and 90 is that the piston assembly 58 of the regulator 10 is replaced by a diaphragm assembly 92. As may be seen in FIG. 2, the periphery of a flexible, imperforate member 94 and an annular sealing gasket 97 are clamped between the lower end of the cover member 70 and the body 12. The central portion of the diaphragm member 94 is clamped between a pair of circular members 98 and 99. The member 99 includes a depending stem portion which has a blind axial hole in the bottom into which a rod 100 is positioned. A venturi assist tube 102 extends downwardly from the chamber below the diaphragm 94 into the outlet port 14, whereby an additional downward force is exerted on the diaphragm by the flow of air across the bottom open end of the tube 102.

As in the regulator 10, the surface of the diaphragm 74 which is exposed to the ambient water has a greater effective working area than the effective working area of the diaphragm 92 which is exposed to the intermediate pressure chamber 16. Therefore, as the diver descends and inhales, the intermediate pressure increases over ambient by an amount which is proportional to the depth of the diver.

Figure 3:
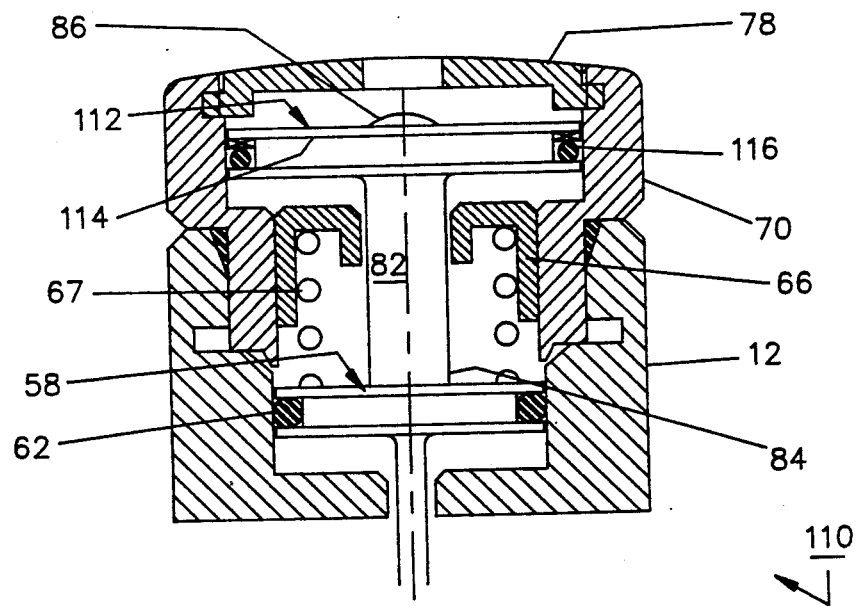
FIG. 3 is a fragmentary, longitudinally sectioned view of still another first stage regulator embodying the present invention.

Referring to FIG. 3, there is shown a portion of a first stage regulator 110 incorporating another embodiment of the invention. The regulator 110 is similar to the regulator 10 and like parts are identified by the same reference number. In the regulator 110, a piston assembly 112 replaces the diaphragm 74 in the regulator 10. The piston assembly 112 is provided with an annular peripheral groove in which a resilient sealing gasket in the form of an O-ring 16 is retained in sealing relationship with the wall of the bore in the cover member 70 to seal the chamber below the piston assembly from the ambient. As may be seen, the piston 112 has a greater upper surface area than that of the lower surface of the piston 58 which is exposed to the intermediate pressure. Consequently, as is the case in the regulators 10 and 90, the intermediate pressure increases over ambient by an amount which is proportional to the depth of the diver.

It will be understood that many changes and modifications may be made without departing from the true spirit and scope of the present invention. Therefore, it is intended by the appended claims to cover all such changes and modifications that come within the true spirit and scope of the present invention.

I claim:

1. A first stage pressure regulator for use with a high pressure source of breathable gas, comprising in combination a regulator body having a first ambient pressure chamber therein, imperforate force transfer means mounted across said first chamber to seal said first chamber from the ambient with one side of said force transfer means being exposed to the ambient, means defining a second intermediate pressure chamber in said regulator body, an intermediate pressure outlet port opening into said second intermediate pressure chamber, a high pressure inlet port opening into a high pressure chamber in said regulator body, valve means connected between said high pressure chamber and said second intermediate pressure chamber, a bore in said regulator body opening into said first chamber, valve control means movably mounted in said bore and operatively connected to said valve means, said valve control means having one side thereof exposed to said second intermediate pressure chamber and being operatively connected to said force transfer means, and the effective working area of said one side of said force transfer means exposed to the ambient being greater than the effective working area of said one side of said valve control means exposed to said second intermediate pressure chamber, rigid tubular means connected between said imperforate force transfer means and said valve control means, said tubular means having a longitudinal passageway connected to said first ambient chamber, and relief valve means connected between said passageway and the ambient.

2. A first stage pressure regulator according to claim 1 wherein said imperforate force transfer means comprises a diaphragm.

3. A first stage pressure regulator according to claim 1 wherein said imperforate force transfer means comprises a piston.

4. A first stage pressure regulator according to claim 1 wherein said valve control means is a piston.

5. A first stage pressure regulator according to claim 1 wherein said valve control means is a diaphragm.

6. A first stage pressure regulator according to claim 1, comprising relief valve means connected between said first ambient chamber and the ambient.

7. A first stage pressure regulator, comprising in combination a regulator body having a first ambient pressure chamber therein, imperforate force transfer means mounted across said first chamber to seal said first chamber from the ambient with one side of said force transfer being exposed to the ambient, means defining a second intermediate pressure chamber in said regulator body, an intermediate pressure outlet port opening into said second intermediate pressure chamber, a high pressure inlet port opening into a high pressure chamber in said regulator body, demand valve means connected between said high pressure chamber and said second intermediate pressure chamber, a bore in said regulator body opening into said first chamber, valve control means movably mounted in said bore and operatively connected to said valve means, said valve control means having on side thereof exposed to said second intermediate pressure chamber and being operatively connected to said force transfer means, rigid tubular means connected between said imperforate force transfer means and said valve control means, said tubular means having a longitudinal passageway connected to said first ambient chamber, and relief valve means connected between said passageway and the ambient.

* * * * *